(12) United States Patent
Boscia et al.

(10) Patent No.: US 8,124,678 B2
(45) Date of Patent: Feb. 28, 2012

(54) NANOCOMPOSITE MASTER BATCH COMPOSITION AND METHOD OF MANUFACTURE

(75) Inventors: B. Dillon Boscia, West Henrietta, NY (US); David J. Arthur, Norwood, MA (US); Aaron Wagner, Rochester, NY (US)

(73) Assignee: NaturalNano, Inc., Pittsford, NY (US)

( * ) Notice: Subject to any disclaimer, the term of this patent is extended or adjusted under 35 U.S.C. 154(b) by 1127 days.

(21) Appl. No.: 11/945,413

(22) Filed: Nov. 27, 2007

(65) Prior Publication Data

US 2011/0086956 A1    Apr. 14, 2011

Related U.S. Application Data

(60) Provisional application No. 60/867,369, filed on Nov. 27, 2006.

(51) Int. Cl.
*C08K 3/34* (2006.01)
*C08K 5/19* (2006.01)

(52) U.S. Cl. ........................ 524/236; 524/445

(58) Field of Classification Search .................. 524/236, 524/445
See application file for complete search history.

(56) References Cited

U.S. PATENT DOCUMENTS

| | | |
|---|---|---|
| 3,059,379 A | 10/1962 | Attoe |
| 3,488,166 A | 1/1970 | Kovak et al. |
| 3,616,973 A | 11/1971 | Hartley |
| 3,833,534 A | 9/1974 | Tierney et al. |
| 3,971,749 A | 7/1976 | Blunt |
| 4,019,934 A | 4/1977 | Takayama et al. |
| 4,150,099 A | 4/1979 | Robson |
| 4,364,857 A | 12/1982 | Santilli |
| 4,434,075 A | 2/1984 | Mardis et al. |
| 4,582,866 A | 4/1986 | Shain |
| 4,591,485 A | 5/1986 | Olsen et al. |
| 4,871,536 A | 10/1989 | Arraudeau et al. |
| 4,877,501 A | 10/1989 | Schnur et al. |
| 4,887,622 A | 12/1989 | Gueret |
| 4,889,885 A | 12/1989 | Usuki et al. |
| 4,894,411 A | 1/1990 | Okada et al. |
| 4,911,981 A | 3/1990 | Schnur et al. |
| 5,039,338 A | 8/1991 | Kondo et al. |
| 5,049,382 A | 9/1991 | Price et al. |
| 5,133,590 A | 7/1992 | Fitjer |
| 5,284,683 A | 2/1994 | Erhan |
| 5,330,552 A | 7/1994 | Rizzo |
| 5,385,776 A | 1/1995 | Maxfield et al. |
| 5,462,798 A | 10/1995 | Gueret |
| 5,492,696 A | 2/1996 | Price et al. |

(Continued)

FOREIGN PATENT DOCUMENTS

CN    1673200    9/2005

(Continued)

OTHER PUBLICATIONS

International Search Report and Written Opinion dated Aug. 1, 2008 for PCT/US2008/059017, (published as WO 2008/124391) which corresponds to U.S. Appl. No. 11/697,510.

(Continued)

*Primary Examiner* — Robert D. Harlan
(74) *Attorney, Agent, or Firm* — Duane C. Basch; Basch & Nickerson LLP

(57) ABSTRACT

Disclosed are a polymer nanocomposite material and methods for the formation of the polymer nanocomposite material.

19 Claims, 3 Drawing Sheets

U.S. PATENT DOCUMENTS

| | | | |
|---|---|---|---|
| 5,514,734 A | 5/1996 | Maxfield et al. | |
| 5,618,523 A | 4/1997 | Zysman et al. | |
| 5,651,976 A | 7/1997 | Price et al. | |
| 5,705,191 A | 1/1998 | Price | |
| 5,718,841 A | 2/1998 | Mardis et al. | |
| 5,744,337 A | 4/1998 | Price et al. | |
| 5,747,560 A | 5/1998 | Christiani et al. | |
| 5,780,376 A | 7/1998 | Gonzales et al. | |
| 5,855,818 A | 1/1999 | Gan et al. | |
| 5,952,093 A | 9/1999 | Nichols et al. | |
| 5,980,871 A | 11/1999 | Lukenbach | |
| 6,013,206 A | 1/2000 | Price et al. | |
| 6,015,574 A | 1/2000 | Cannell | |
| 6,034,163 A | 3/2000 | Barbee et al. | |
| 6,036,765 A | 3/2000 | Farrow et al. | |
| 6,221,389 B1 | 4/2001 | Cannell | |
| 6,280,759 B1 | 8/2001 | Price et al. | |
| 6,401,816 B1 | 6/2002 | Price | |
| 6,414,070 B1 | 7/2002 | Kausch et al. | |
| 6,420,293 B1 | 7/2002 | Chang et al. | |
| 6,437,050 B1 | 8/2002 | Krom et al. | |
| 6,475,696 B2 | 11/2002 | Majumdar et al. | |
| 6,518,324 B1 | 2/2003 | Kresta et al. | |
| 6,548,159 B2 | 4/2003 | Tsai et al. | |
| 6,822,032 B2 | 11/2004 | Gallucci | |
| 6,838,508 B2 | 1/2005 | Hsiao et al. | |
| 6,919,063 B2 | 7/2005 | Jang et al. | |
| 6,958,860 B2 | 10/2005 | Dontula et al. | |
| 7,046,439 B2 | 5/2006 | Kaminsky et al. | |
| 7,068,898 B2 | 6/2006 | Buretea et al. | |
| 7,078,452 B2 | 7/2006 | Ebrahimian et al. | |
| 7,115,282 B2 | 10/2006 | Shefer et al. | |
| 7,135,508 B2 | 11/2006 | Chaiko et al. | |
| 7,400,490 B2 | 7/2008 | Gunderman et al. | |
| 7,679,883 B2 | 3/2010 | Gunderman et al. | |
| 7,888,419 B2 | 2/2011 | Cooper et al. | |
| 2001/0026802 A1 | 10/2001 | Price et al. | |
| 2002/0110686 A1 | 8/2002 | Dugan | |
| 2002/0142022 A1 | 10/2002 | Price et al. | |
| 2002/0151634 A1 | 10/2002 | Rohrbaugh | |
| 2002/0156171 A1 | 10/2002 | Drewniak et al. | |
| 2002/0160159 A1 | 10/2002 | McDonald | |
| 2002/0168509 A1 | 11/2002 | DeSimone et al. | |
| 2003/0039750 A1 | 2/2003 | Mao et al. | |
| 2003/0085132 A1 | 5/2003 | Cobley et al. | |
| 2003/0087103 A1 | 5/2003 | Belmares et al. | |
| 2003/0099798 A1 | 5/2003 | George et al. | |
| 2003/0100653 A1 | 5/2003 | Chacko | |
| 2003/0100654 A1 | 5/2003 | Chheang et al. | |
| 2003/0191213 A1 | 10/2003 | Troutman et al. | |
| 2003/0205072 A1 | 11/2003 | Van Der Merwe | |
| 2004/0013597 A1 | 1/2004 | Mao et al. | |
| 2004/0030020 A1 | 2/2004 | Liang et al. | |
| 2004/0040834 A1 | 3/2004 | Smalley et al. | |
| 2004/0052957 A1 | 3/2004 | Cramer et al. | |
| 2004/0074778 A1 | 4/2004 | Cobley et al. | |
| 2004/0086656 A1 | 5/2004 | Kohl et al. | |
| 2004/0141932 A2 | 7/2004 | Kanji | |
| 2005/0032959 A1 | 2/2005 | Cheung et al. | |
| 2005/0038173 A1 | 2/2005 | Harris et al. | |
| 2005/0165151 A1 | 7/2005 | Fujiwara et al. | |
| 2005/0171265 A1* | 8/2005 | Bortnick et al. | 524/445 |
| 2005/0227074 A1 | 10/2005 | Oyamada et al. | |
| 2005/0272846 A1 | 12/2005 | Price et al. | |
| 2006/0035087 A1 | 2/2006 | Yadav et al. | |
| 2006/0062840 A1 | 3/2006 | Price et al. | |
| 2006/0065537 A1 | 3/2006 | Barstad et al. | |
| 2006/0073335 A1 | 4/2006 | Oyamada et al. | |
| 2006/0089444 A1 | 4/2006 | Goodman et al. | |
| 2006/0102871 A1 | 5/2006 | Wang et al. | |
| 2006/0134362 A1 | 6/2006 | Lu et al. | |
| 2006/0142455 A1 | 6/2006 | Agarwal et al. | |
| 2006/0155012 A1 | 7/2006 | Riebel | |
| 2006/0163160 A1 | 7/2006 | Weiner et al. | |
| 2006/0165926 A1 | 7/2006 | Weber | |
| 2006/0166810 A1 | 7/2006 | Gunderman et al. | |
| 2006/0183328 A1 | 8/2006 | Barstad et al. | |
| 2006/0193978 A1 | 8/2006 | Toth | |
| 2006/0196764 A1 | 9/2006 | Schoen et al. | |
| 2006/0240251 A1 | 10/2006 | Lunsford et al. | |
| 2006/0247332 A1 | 11/2006 | Coffey et al. | |
| 2006/0293430 A1 | 12/2006 | Wang et al. | |
| 2007/0106006 A1 | 5/2007 | Cooper et al. | |
| 2007/0148457 A1 | 6/2007 | Wagner et al. | |
| 2007/0227351 A1 | 10/2007 | Garcia-Martinez | |
| 2007/0292459 A1 | 12/2007 | Cooper et al. | |
| 2008/0194406 A1 | 8/2008 | Price et al. | |
| 2008/0248201 A1 | 10/2008 | Corkery et al. | |
| 2008/0249221 A1 | 10/2008 | Corkery et al. | |
| 2008/0262126 A1 | 10/2008 | Fleischer et al. | |
| 2009/0005489 A1 | 1/2009 | Daly et al. | |
| 2009/0326133 A1 | 12/2009 | Daly et al. | |
| 2010/0171081 A1 | 7/2010 | Gunderman et al. | |

FOREIGN PATENT DOCUMENTS

| | | |
|---|---|---|
| CN | 1746216 | 3/2006 |
| JP | 2000297179 | 10/2000 |
| WO | WO9848623 | 11/1998 |
| WO | WO2004106420 | 12/2004 |
| WO | WO2006127572 | 11/2006 |
| WO | WO2007011586 | 1/2007 |
| WO | WO2007048018 | 4/2007 |
| WO | WO2007142663 | 12/2007 |
| WO | WO2008045028 | 4/2008 |
| WO | WO2008104851 | 9/2008 |
| WO | WO2008112362 | 9/2008 |
| WO | WO2008124389 | 10/2008 |
| WO | WO2008124391 | 10/2008 |
| WO | WO2009002994 | 12/2008 |
| WO | WO2009029310 | 3/2009 |
| WO | WO2010056689 | 5/2010 |

OTHER PUBLICATIONS

International Search Report and Written Opinion dated Feb. 7, 2008 for PCT/US2008/053270 (WO 2008/112362) which corresponds to U.S. Appl. No. 12/027,402.

International Search Report and Written Opinion dated Apr. 2, 2008 for PCT/US2006/034281 (published as WO 2007/142663) which corresponds to U.S. Appl. No. 11/469,128.

International Search Report and Written Opinion dated Aug. 7, 2008 for PCT/US2008/059009 (published as WO 2008/124389) which corresponds to U.S. Appl. No. 11/697,490.

International Search Report and Written Opinion dated Jan. 30, 2009 for PCT/US2008/064640 (published as WO 2009/029310) which corresponds to U.S. Appl. No. 12/126,035.

International Search Report and Written Opinion dated Jul. 23, 2008 for PCT/US2006/035659 (published as WO 2008/124389) which corresponds to U.S. Appl. No. 11/531,459.

International Search Report and Written Opinion dated Jun. 25, 2009 for PCT/US2008/068095 (published as WO 2009/002994) which corresponds to U.S. Appl. No. 12/145,525.

International Search Report and Written Opinion dated Mar. 4, 2010 for PCT/US2009/063950 filed Nov. 11, 2009 (published as WO 2010/056689).

International Search Report and Written Opinion dated May 7, 2007 for PCT/US2006/041208 (published as WO/2007/048018 A2) which corresponds to U.S. Appl. No. 11/551,115.

File History for U.S. Appl. No. 12/987,594, filed Jan. 10, 2011; Inventors Cooper et al.

File History for U.S. Appl. No. 60/713,362, filed Sep. 2, 2005; Inventors Cooper et al.

File History for U.S. Appl. No. 60/717,533, filed Sep. 14, 2005; Inventors Weiner et al.

File History for U.S. Appl. No. 60/728,939, filed Oct. 22, 2005; Inventors Weiner et al.

File History for U.S. Appl. No. 60/867,369, filed Jan. 27, 2006; Inventors Boscia et al.

File History for U.S. Appl. No. 60/888,685, filed Feb. 7, 2007; Inventors Fleischer et al.

File History for U.S. Appl. No. 60/939,658, filed May 23, 2007; Inventors Daly et al.

Prosecution History as of Feb. 9, 2011 for U.S. Appl. No. 11/469,128, filed Aug. 31, 2006; published May 10, 2007 as US-2007-0106006-A1; issued Feb. 15, 2011 as US 7,888,419; Inventors Cooper et al.

Prosecution History as of Feb. 9, 2011 for U.S. Appl. No. 11/697,510, filed Apr. 6, 2007; published Oct. 9, 2008 as US-2008-0248201-A1; Inventors Corkery et al.

Prosecution History as of Mar. 23, 2011 for U.S. Appl. No. 11/697,490, filed Apr. 6, 2007; published Oct. 9, 2008 as US-2008-0249221-A1; Inventors Corkery et al.

Prosecution History as of Mar. 23, 2011 for U.S. Appl. No. 11/551,115, filed Oct. 19, 2006; published Aug. 14, 2006 as US-2008-0194406-A1; Inventors Price et al.

Prosecution History as of Mar. 23, 2011 for U.S. Appl. No. 12/027,402, filed Feb. 7, 2008; published Oct. 23, 2008 as US-2008-0262126-A1; Inventors Fleischer et al.

Prosecution History as of Mar. 23, 2011 for U.S. Appl. No. 12/126,035, filed May 23, 2008; published Dec. 31, 2009 as US-2009-0326133-A1; Inventors Daly et al.

Prosecution History as of Sep. 28, 2010 for U.S. Appl. No. 11/531,459, filed Sep. 13, 2006; published Jun. 28, 2007 as US-2007-0148457-A1; Inventors Wagner et al.

Prosecution History as of Sep. 28, 2010 for U.S. Appl. No. 11/042,219, filed Jan. 25, 2005; published Jul. 26, 2006 as US 2006-0163160 A1 ;Inventors Weiner et al.

Prosecution History of US Patent 7,400,490 as of Sep. 28, 2010.

Arkles; B. Arkles; Silane Coupling Agents: Connecting Across Boundaries; V2.0, copyright 2006.

Ash, B. et al.; Investigation into the Thermal and Mechanical Behavior of PMMA/Alumina Nanocomposites; Materials Research Society Symposium Proceedings, vol. 661, p. KK2 10.1-6 (2001).

Baral et al. 'Electroless Metalization of Halloysite, a Hollow Cylindrical 1:1 Aluminosilicate of Submicron Diameter.' In; Chem. Mater., 1993, vol. 5, No. 9, pp. 1227-1232.

Bergman, J.; Chen, H.; Giannelis, P.; Thomas, M., Coates, G.; Synthesis and characterization of polyolefin-silicate nanocomposites: a catalyst intercalation and in situpolymerization approach; Cornell University, Ithaca, NY 14853, US; Chem. Commun., 1999, 2179-2180.

Birnbaum et al.; Linda S. Birnbaum and Daniele F. Staskal; Brominated Flame Retardants: Cause for Concern?; Environmental Health Perspectives, 112: 9-17 (2004).

CN1273200 Li; Abstract of CN1673200 published Sep. 28, 2005; application CN20051033316 20050302 Inventors Li et al.

CN1746216 CAPlus Abstract / Machine Translation of CN1746216; published Mar. 15, 2006; Inventor Guo; Applicant Huanan Science & Engineering (CN).

Du et al.; Preparation and Characterization of Polypropylene Grafted Halloysite and Their Compatibility Effect to Polypropylene/Halloysite Composite; Polymer Journal, vol. 38, No. 11, pp. 1198-1204 (2006) The Society of Polymer Science, Japan.

Du, M. et al., Thermal Stability and Flame Retardant Effects of Halloysite Nanotubes on Poly(propylene); published in the European Polymer Journal, vol. 42, p. 1362-69 (2006).

Frost; Raman Microprobe spectroscopy of halloysite. Clays and Clay Minerals, 1997, vol. 45, No. 1, 66-72.

Gao, F.; Clay/Polymer Composites: the story; MaterialsToday Nov. 2004; pp. 50-55.

Gay et al.; C. Gay, L. Liebler; Theory of Tackiness; Physical Review Letters, 82 (5) 936-9 (1998).

Gilman et al.; J.W. Gilman, C.L. Jackson, A.B. Morgan, R. Harris, E. Manias, E.P. Giannelis, M. Wuthenow, D. Hilton and S.H. Philips; Flammability properties of polymer-silicate nanocomposites; Chem. Mater.,12: 1866-1873 (2000).

Gregoriou, V.G.; Kandilioti, G.; Bolas, S.T.; Chain conformational transformations in sydiotactic polypropylene/layered silicate nanocomposites during mechanical elongation and thermal treatment; Polymer 46 (2005); 11340-50.

Harrison et al.; Dehydration of Fully Hydrated Halloysite from Lawrence County, IndianaClays and Clay Minerals; vol. 9: Issue 1: 374-377, (1960).

Howlin et al.; Modelling of Interaction at the Composite Interface Between Aluminosilicate Nanotubes and Polymer Matrices; Book of Abstracts, 218the ACS National Meeting, New Orleans, Aug. 22-26 (1999).

JP2000297179 Machine Translation JP2000297179; published Oct. 24, 2000; application JP11-105278 filed Apr. 13, 1999; Inventors/Applicants Henmi Akio et al.

Levis, S. et al.; Use of coated microtubular halloysite for the sustained release of diltiazem hydrochloride and propanolol hydrochloride; International Journal of Pharmaceutics; 253 (2003) 145-157.

Liu et al.; Properties of halloysite nanotube-epoxy resin hybrids and the interfacial reactions in the systems. Nanotechnology 2007, 18, 1-9.

Messersmith et al.; Messersmith, P. ;Giannelis, E.; Synthesis and Barrier Propeties of Poly(e-Caprolactone)-Layers Silicate Nanocomposites; J. Polym. Sci., Part A, Polym. Chem., 33, 1049 (1995).

Osman et al.; M.A. Osman, M. Ploetze and U.W. Suter; Surface treatment of clay minerals; J. Mater. Chem., 13, 2359-2366 (2003).

Price, R.In-Vitro Release Characteristics of Tetracycline HCI, khellin and Nicotinamide Adenine Dineculeotide from Halloysite; a Cylindrical Mineral, by R. Price et al., published in Journ. Microencapsulation, 2001, vol. 18, No. 6, p. 713-722.

Si et al.; M. Si; V. Zaitsev; M. Goldman; A. Frenkel; D.G. Peiffer; E.; J.C. Sokolov; M.H. Rafailovich; Self-extinguishing polymer/organoclay nanocomposites; Polymer Degradation and Stability, 92, 86-93 (2007).

Vanesch; G.J. vanEsch; World Health Organization; Flame Retardants: A General Introduction, Environmental Health Criteria 192, (1997).

Wagner et al.; Natural nanotubes enhance biodegradable and biocompatible nanocompsites. Industrial Biotechnology. 2005. pp. 190-193.

Wang et al.; Waterborne, Nanocomposite Pressure-Sensitive Adhesives with High Tack Energy, Optical Transparency, and Electrical Conductivity; Advanced Materials 2006, 18, 2730-2734.

Wang, X.; Li,Y.; Solution-based routes to transition-metal oxide one-dimensional nanostructures; Department of Chemistry, Tsinghua University, Beijing 100084, China; Pure Appl. Chem., vol. 78, No. 1, pp. 45-64, 2006; doi:10.1351/pac200678010045; c. 2006 IUPAC; pp. 1-20.

Ye et al.; High impact strength epoxy nanocomposites with natural nanotubes. Polymer, 2007, 48, 6426-6433.

Zanetti et al.;M. Zanetti, T. Kashiwagi, L.Falqui, G. Camino; Cone Calorimeter Combustion and Gasification Studies of Polymer Layered Silicate Nanocomposites; Chem. Mater., 14: 881-887 (2002).

Zanetti et al: M. Zanetti, G. Camino, C. Canavese, A.B. Morgan, F.G. Lamelas, C.A. Wilkie; Fire Retardant Halogen-Antimony-Clay Synergism in Polypropylene Layered Silicate Nanocomposites; Chem. Mater., 14. 189-193 (2002).

* cited by examiner

NANOCOMPOSITE MASTER BATCH COMPOSITION AND METHOD OF MANUFACTURE This application claims priority from U.S. Provisional application 60/867,369 for "Polypropylene Nanocomposite Master Batch Composition And Method Of Manufacture" filed Nov. 27, 2006 by B. Dillon Boscia et al., which is hereby incorporated by reference in it entirety.

BACKGROUND AND SUMMARY

The following disclosure relates to a novel polymeric composite including a nanoparticle filler, and a process for making the composite. More particularly, the disclosure provides a novel method for the production of a nanocomposite including a polymer and halloysite nanoparticle filler, the filler having general shape of a cylinder or rolled scroll-like element, in which the diameter of the cylinder is less than about 500 nm. The advantages of the nanoparticle filler are provided (e.g., reinforcement, flame retardant, improved or equivalent mechanical performance) as a result of the ability to disperse the nanoparticle within and/or on the surface of a polymeric structure.

The addition of various nano-clay materials to polymer systems can lead to improved mechanical properties (such as toughness/ductility or strength) and/or thermodynamic stability. Details of such advantages as well as alternative materials and their characteristics are found, for example, in several prior patent applications relating to halloysite nanocomposites and applications thereof, including:

U.S. Provisional Application 60/713,362 for a "Polymeric Composite Comprising Halloysite," filed Sep. 2, 2005 by S. Cooper;

U.S. application Ser. No. 11/469,128 for "Polymeric Composite Including Nanoparticle Filler" filed Aug. 31, 2006 by Sarah H. Cooper et al.; and U.S. application Ser. No. 11/531,459 for "Radiation Absorptive Composite and Methods for Production" filed Sep. 13, 2006 by A. Wagner et al.;

the disclosures of all of the above-identified applications being hereby incorporated by reference in their entirety.

Composite materials have become well known as man-made materials are increasingly substituted for raw materials in construction, fabrication and the like (e.g., automobiles, building materials, food packaging and textiles). A polymer composite includes at least one polymer matrix or material in combination with at least one particulate filler material. The polymer matrix material may be any of a number of polymers including thermoplastics such as Polypropylene, Polyaramide, Polyarylamide, Polycarbonate, Polystyrene, Styrene Acrylonitrile, Acrylonitrile Butadiene Styrene, Acetal, Polysulfone, Polybutylene Terephthalate, Polyethylene Terephthalate, Polyethylene, Thermoplastic Polyurethane Elastomer, Polyphenylene Sulfide, Polyether Sulfone, Polyphenylene Oxide, Acrylic, Polyetherimide, Polyetheretherketone, Polyetherketone, Polymethylpentene, Perfluoroalkoxy, Ethylene Tetrafluroethylene, Polyvinylidene Fluoride, Fluorinated Ethylrene Propylene, Liquid Crystal Polymers, Polyphthalamide, Thermoplastic polyimide, and other thermoplastic polymers plus blends and co-polymers and may also include polyamide (Nylon), poly-urethane, polyolefins, vinyl polymers, and the like, thermosets, and elastomers. As the understanding of the structure-property relationships of composites becomes better understood, the use of nanoparticles is of increasing interest in the formation of composites—referred to as nanocomposites. Some of the most common nanoparticle fillers are two-dimensional nano-clays, one-dimensional carbon nanotubes, and zero-dimensional metal oxide nanoparticles such as Zinc Oxide (ZnO), Titanium Dioxide (Ti02), and Zirconia ($ZrO_n$). Composites offer the potential of materials having properties that are not often available in naturally occurring raw materials (e.g., U.S. Pat. No. 6,518,324 to Kresta et al. for a Polymer Foam Containing Nanoclay, hereby incorporated by reference in its entirety).

There are several known ways in which to form polymer nanocomposites utilizing nanoclay materials. Traditionally the processes include melt compounding (via melt extrusion of pre-treated fillers) as contrasted with the disclosed process of solution blending and in-situ treatment of the filler utilizing a master batch. The following disclosure is directed, in one embodiment, to the use of a master batch that includes a high-concentration of halloysite nanoparticles (e.g., 30% by weight of halloysite with nanotubes) produced for subsequent processing.

The advantages of a master batch or nanocomposite material produced in accordance with the description below are numerous. One advantage is that the composite exhibits better dispersion within the final material/product, resulting in improved mechanical properties because of the more consistent dispersion. Defects in the composite, due to poor dispersion, will lead to weak points in the final composite, thus compromising the mechanical properties. Another advantage is that this process makes it easier to prepare highly concentrated compounds (e.g., about 30 wt % or higher) that are desired for master batch, without the rheological limitations of melt compounding. In melt compounding processes, only a limited amount of filler can be used, due to the increase in viscosity that occurs at high loading levels, often making it impractical to extrude highly loaded materials. This process can be utilized for a wider range of polymers, since dispersion and melt viscosity issues are avoided. When using a master batch, the material may also be provided in commercial quantities to facilitate the ability of a manufacturer to utilize the material as it avoids inherent problems with handling clays (e.g., dusting). The same advantages set forth apply for use of the material as well.

Disclosed in embodiments herein is a method of production of a polymer nanocomposite master batch, comprising: dissolving a polymer (e.g., a soluble polymer) in a solvent to produce a polymer solution; adding a dispersing aide to the polymer solution; further combining a filler material (e.g., a nanomaterial including a processed clay material such as halloysite) to the polymer solution to produce a dissolved polymer intimately mixed with the nanocomposite material (mixture); and causing the precipitation of the mixture to produce a nanocomposite master batch.

Further disclosed in embodiments herein is a method of making a polymer nanocomposite, comprising: dissolving a polymer in a solvent to produce a polymer solution; adding a dispersing aide to the polymer solution; further combining a filler material to the polymer solution to produce a dissolved polymer intimately mixed with the nanocomposite material (mixture); and causing the precipitation of the mixture to produce a nanocomposite material.

Also disclosed in embodiments herein is a polymer nanocomposite material, comprising: from about 5 wt % to about 60 wt % of a nanocomposite filler; and a polymer.

The various embodiments described herein are not intended to limit the disclosure. On the contrary, the intent is to cover all alternatives, modifications, and equivalents as may be included within the spirit and scope defined by the appended claims.

DETAILED DESCRIPTION

As more particularly set forth below, the disclosed compositions and methods for manufacture are directed toward a master batch of high nanomaterial filler concentration polymer additive.

This disclosure centers on the production of a polymer nanocomposite. The nanoclay material used for property enhancement is halloysite. Disclosed herein is a process for making a "master batch" of a high halloysite concentration in a polymer, such as polypropylene. The nanocomposite additive thus formed can be further compounded with the pure polymer to yield a resulting nanocomposite material. For example, the master batch product is an intimate mixture of from about 5% to about 60% by weight, preferably approximately 20% to 40% by weight and more preferably about 30% by weight, of halloysite and approximately 60% to 80% by weight of polypropylene. To make a 5% halloysite nanocomposite, for example, 16.67% of a 30% master batch would be compounded with 83.33% of pure polypropylene.

The master batch process is employed to produce and maintain a homogenous dispersion of the Halloysite initially in a polymer-containing liquid, and subsequently precipitated and processed to form a solid, high-concentration nanocomposite that may be further processed with additional polymer material to produce another nanocomposite with a desired final Halloysite-to-polymer concentration.

Figure 1:
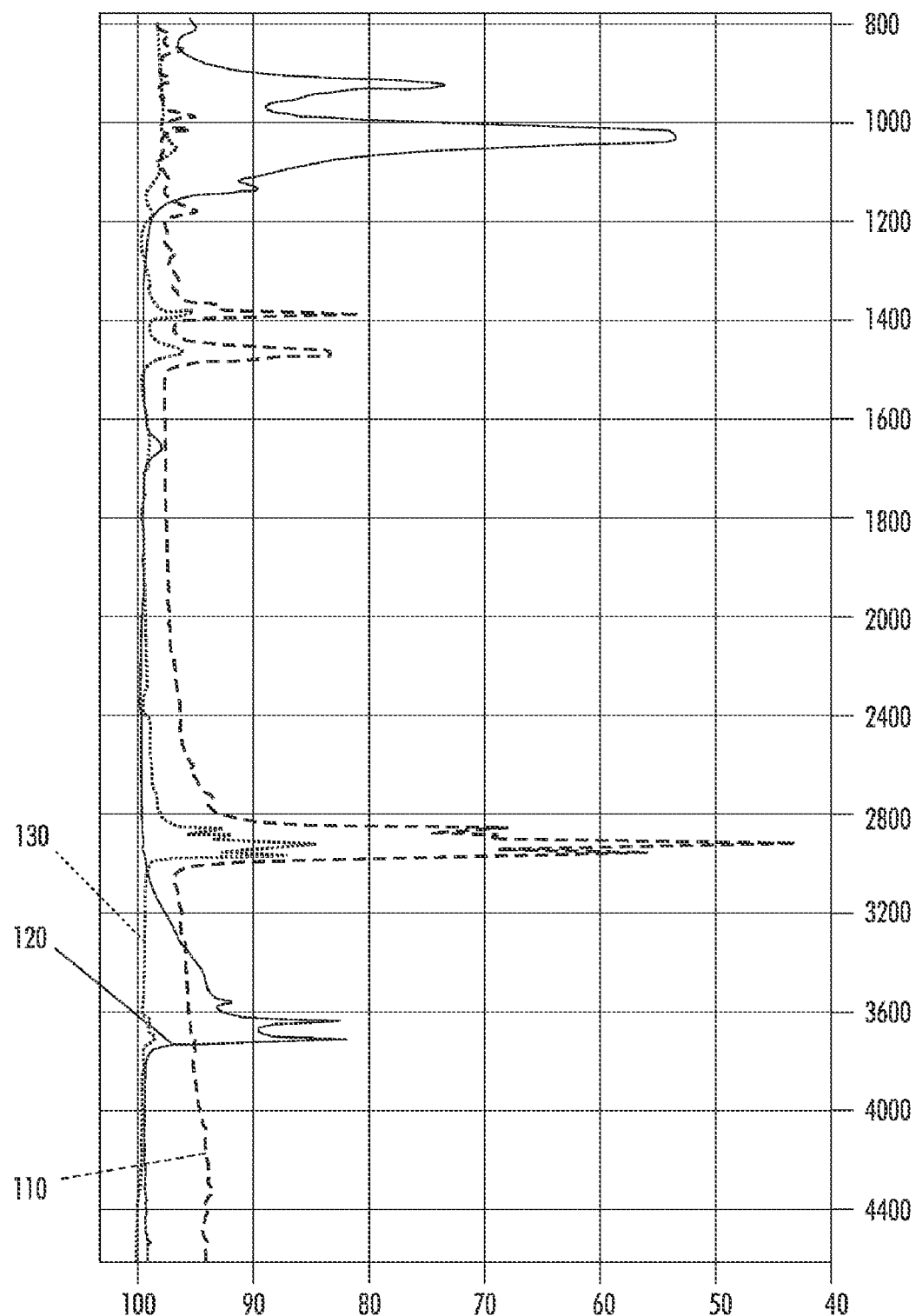
FIG. 1 is an exemplary representation of Fourier-transform infrared spectroscopy (FTIR) of neat polypropylene, pure halloysite, and nanocomposite (e.g., 5 wt % halloysite and dispersing agent in polypropylene) samples, the nanocomposite produced in accordance with the disclosed process.

In addition, the following disclosure contemplates that the nanocomposite material may be made by directly employing one of the disclosed procedures. As depicted in FIG. 1, an exemplary FTIR characterization may be employed to compare a neat polypropylene (110), pure halloysite (120) and a nanocomposite (e.g., 5 wt % halloysite and dispersing agent in polypropylene; 130) produced in accordance with the processes disclosed herein.

In a general sense, the master batch material is formed using a process that includes, in one embodiment, a solvent dissolution/mixing step, where a polymer such as polypropylene is dissolved in a solvent to produce a polymer solution. The polymer may include any polymeric material that may be dissolved by a solvent, including but not limited to thermoplastics such as Polyolefins, including Polypropylene, Polyethylene, and the like, Polyaramide, Polyarylamide, Polycarbonate, Polystyrene, Polyvinyl chloride, Styrene Acrylonitrile, Acrylonitrile Butadiene Styrene, Acetal, Polysulfone, Polybutylene Terephthalate, Polyethylene Terephthalate, Polyethylene, Thermoplastic Polyurethane Elastomer, Polyphenylene Sulfide, Polyether Sulfone, Polyphenylene Oxide, Vinyl polymers, Acrylic polymers, Polyurethanes, Polyetherimide, Polyetheretherketone, Polyetherketone, Polymethylpentene, Perfluoroalkoxy, Ethylene Tetrafluroethylene, Polyvinylidene Fluoride, Fluorinated Ethylrene Propylene, Liquid Crystal Polymers, Polyphthalamide, Thermoplastic polyimide, polyamide (nylon), and other thermoplastic polymers plus blends and co-polymers, thermosets, and elastomers.

Added to the polymer solution is at least one dispersing aide suitable for favorably affecting the dispersion of the halloysite in the polymer solution. The dispersing aide is typically a surfactant or compatibilizing agent, which has one functional group that is compatible with the solvent and/or polymer and one component that is compatible with the halloysite material. The dispersing agent includes, but is not limited to the group consisting of quaternary amines (quat compounds such as benzalkonium chloride (BAC)), silanes, titanates, organic acids, coupling agents and block co-polymers.

In one embodiment, the polymer is polypropylene and the chemical compound is a quat compound (anhydrous or salt form) such as a surface affecting/treatment material. BAC, is added to the polymer solution.

A processed clay-based material, such as nanotubular halloysite, is then added to the polymer solution, to produce a composite solution, via agitation (e.g., sonic/ultrasonic), which is then suitable to be precipitated.

As will be appreciated, the nanoclay material (e.g., halloysite) may preferably be treated using a dispersant or similar surface treatment. In addition to halloysite, alternative inorganic clay materials or minerals may be employed, including but not limited to smectite, kaolin, boulangerite, and imogolite, both singularly and/or in combination with one another or other filler materials. Other fillers that may be suitable include talc, carbon nanotubes, carbon black, cellulose fibers, silica, and alumina. Although various materials and/or treatments may be considered for use as dispersants (e.g., phenyl silane treated nanoclay, phenyl-treated clay, phenyl silane in solvent, etc.), the following examples suggest the use of benzalkonium chloride and/or benzylcetyl dimethammo chloride monohydrate in solvent as they permit the addition of up to approximately thirty-two times the mass of the BAC salt before flocculation occurs. In one example, 0.025 g BAC in 25 ml xylene is believed suitable to suspend up to about 0.785 g of halloysite clay, and twice the amount of BAC can suspend approximately twice the amount of clay. Up to flocculation, the clay finely disperses and suspends in the solvent (e.g., xylene) and remains so with simple stirring or shaking.

Although various solvents may be employed, and depend upon the particular polymer being used for the master batch nanocomposite, the present disclosure specifically contemplates the use of polypropylene (PP) as the polymeric material, and the use of xylene and tetrachloroethylene (TCE) as the solvents in which the material is dissolved. Preferably the solvent is chosen such that the solubility of the polymer is at least about 5% (at a temperature below the solvent boiling point and atmospheric conditions).

Another variable is related to the material into which the dissolved solution of polymer is to be introduced to cause precipitation. Alternatives that could be considered include any non-solvent, in other words, a liquid that would not act as a solvent for the polymer. In the case of polypropylene, water, methanol and acetone were considered for use. As described in the examples below, methanol and acetone are believed particularly suitable for use with the polypropylene as the base polymer. These "non-solvents" preferably result in immediate precipitation of the composite, are separable from solvent via distillation, and are easily removed from the resulting nanocomposite.

Figure 2A:
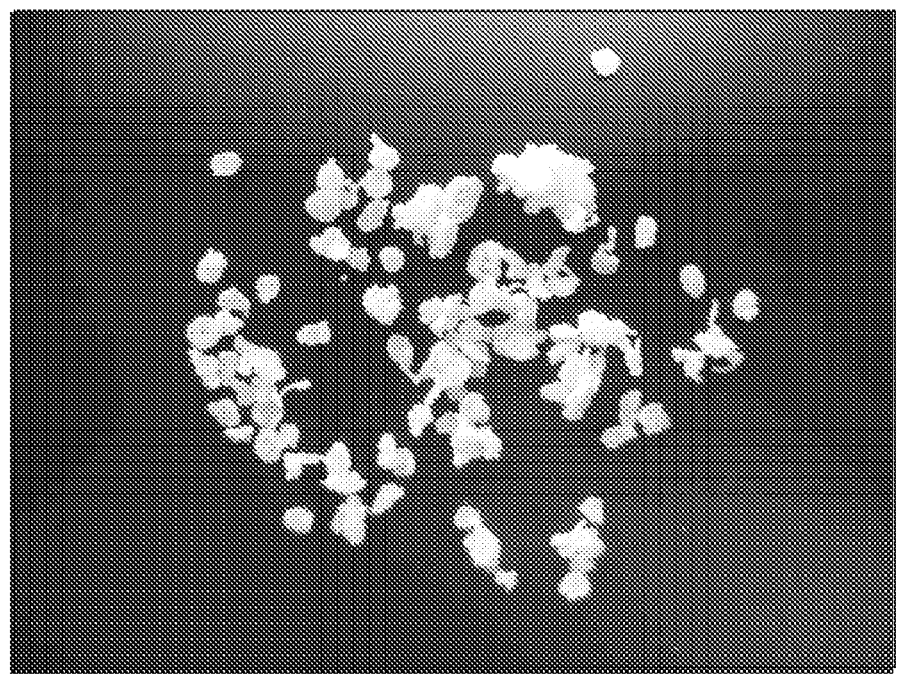
FIGS. 2A and 2B are digital photographs of a resulting nanocomposite (e.g., 5 wt % halloysite and dispersing agent in polypropylene) produced in accordance with the process described herein.
Figure 2B:
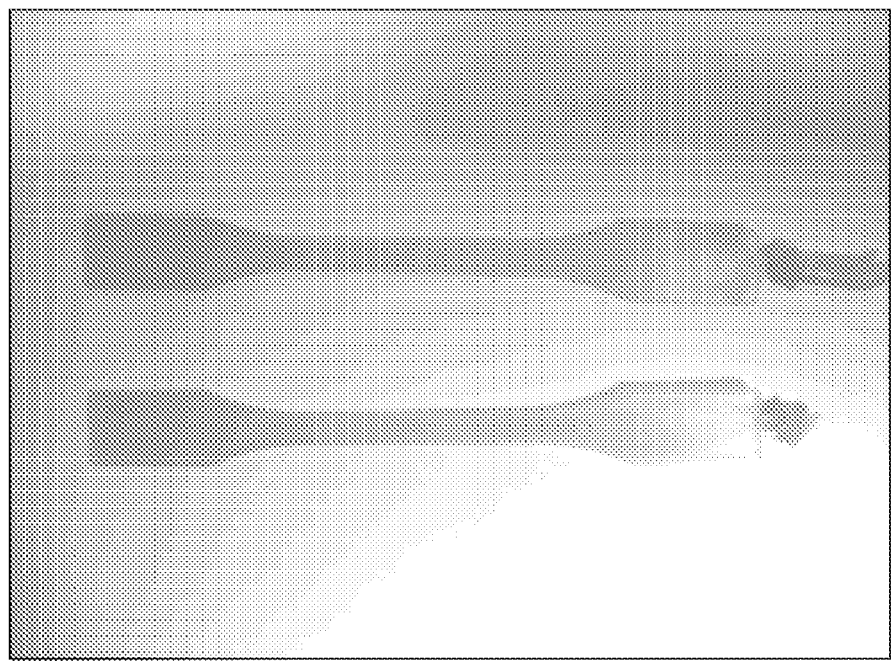

As will be appreciated, the precipitated material may be subsequently filtered, dried, and otherwise processed so as to produce the master-batch material. After completion, the master batch may be used in its highly-concentrated state, or may be further compounded with additional polymer material (virgin or reground/recycled) to produce a nanocomposite with a desired halloysite concentration. FIGS. 2A and 2B are exemplary digital photographs of a nanocomposite (e.g., 5 wt % halloysite and dispersing agent in polypropylene) produced in accordance with the process described herein. The illustration of FIG. 2A is of compounded and ground material whereas FIG. 2B illustrates similar material that has been formed into convenient testing samples.

EXAMPLES

The practice of one or more aspects of the disclosure are illustrated in more detail in the following non-limiting examples:

Example 1

To make a Master batch (Yield approx. 100 g):

1. In a large beaker or glass reaction vessel, heat 2000 ml mixed xylenes, with mild vortex stirring, to 115° C.

Figure 3:
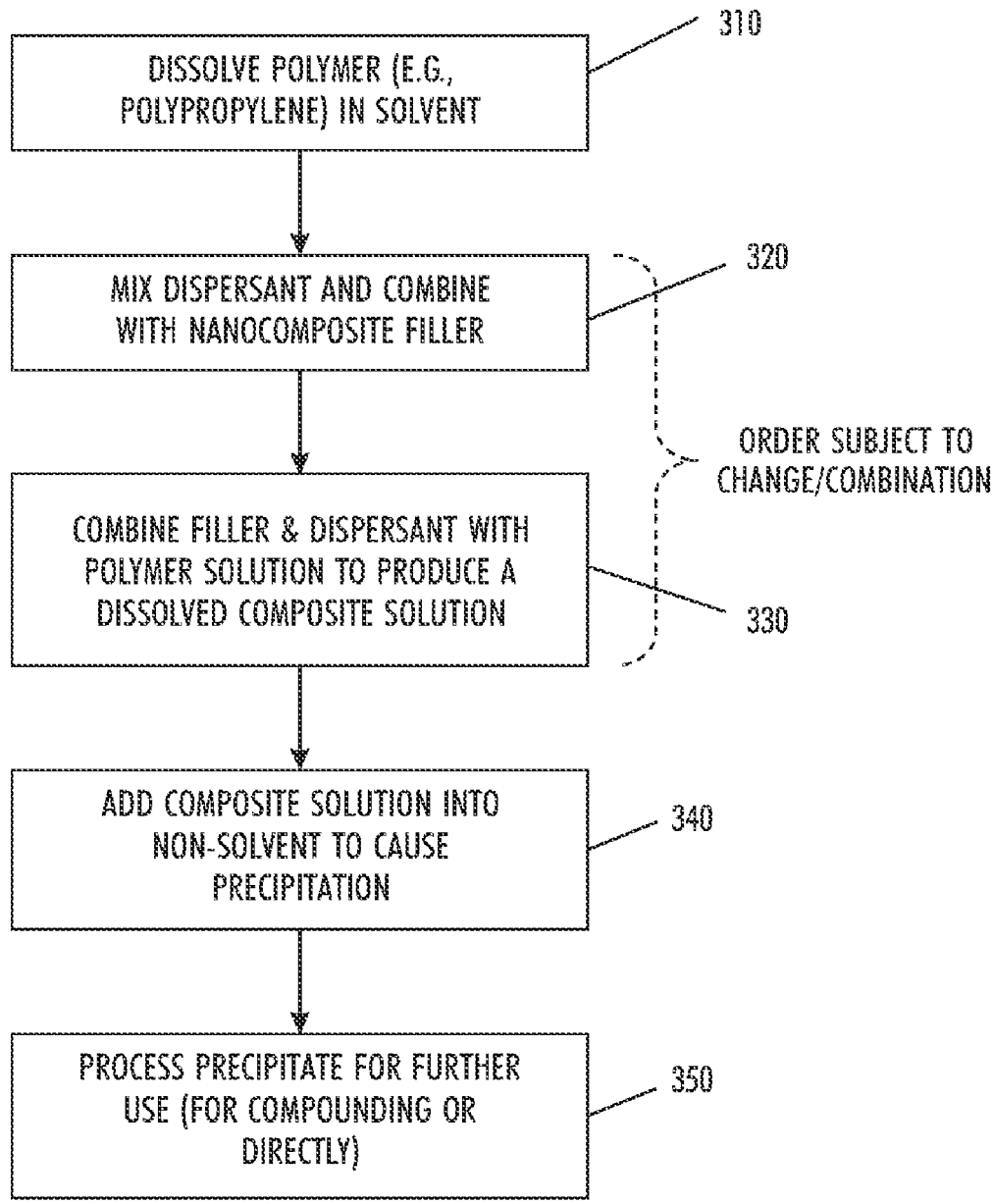
FIG. 3 is flowchart depicting the general steps described in detail in accordance with process below.

2. Dissolve 100 grams polypropylene (PP), such as Exxon-Mobil PP1024E4, into the xylene (e.g., mono or mixed isomers), maintaining temperature and stirring. Keep boiling to a minimum to prevent significant loss of solvent (and staying below the polymer decomposition temperature). Depending on the size of PP particles (beads, powder, etc.), the time to complete dissolution varies from minutes to hours and is related to the energy introduced via heating and mixing as well as the properties of the polymer, solvent, and the nature of the combination. Maintain approximate volume of solution by adding xylene as needed, or by refluxing. FIG. 3, step 310 is intended to represent such dissolution.

3. Add 1.6 g of benzalkonium chloride (BAC) in 100 ml xylene in a glass vial or beaker. A portion of the BAC will be dissolved whereas some BAC may remain in suspension in the mixture. Utilize either a horn sonicator or an ultrasonic bath for this purpose while maintaining constant room temperature.

4. Add 30 g of dried halloysite (e.g., Premium EG, Nanco-Clay and Technologies, air milled and dried at 110° C.; or alternative inorganic mineral as disclosed above) to the 100 ml xylene/BAC mixture and pulse sonicate with a horn sonicator or ultrasonic bath for up to about 1 minute, or time sufficient to partially disperse the material. Step 320 in FIG. 3 is intended to represent the mixing of the dispersant and the nanocomposite filler as described above.

5. Pour the contents of this vial into the hot stirring solution of PP and xylene. Rinse/shake vial or beaker with xylene and add to solution.

6. Allow the mixture to stir for 5-10 minutes to ensure homogeneity. As depicted in FIG. 3, step 330 is intended to represent the combination of the filler and dispersant with the polymer solution (310) to produce a dissolved composite solution.

7. Prepare a vessel containing at least 2000 ml of acetone or any other polypropylene non-solvent such as a low MW anhydrous alcohol (methanol). The liquid should be stirred at an angle (or with baffles) with a high-torque stirrer to assure homogeneous precipitation. It will be appreciated that alternative means for stirring the non-solvent may be employed during the precipitation process.

8. Add the PP solution into the vessel of liquid slowly by either dropping or a slow stream and allow to stir for 10 min.

9. Filter the precipitate over vacuum in a Büchner funnel. Rinse with fresh acetone thrice. Allow to dry over vacuum for 30 minutes. Step 340 in FIG. Is intended to encompass the addition of the composite solution into a non-solvent (e.g., acetone), to produce precipitation.

10. Break up filter cake and place in a vented, sparkless oven at 110° C. overnight to produce the master batch.

11. The master batch is now ready for compounding with neat polypropylene to form a nanocomposite material. As represented by step 350, the precipitate may be further processed or used directly as described herein.

12. The xylene and acetone may be separated by distillation and reused.

In another embodiment, the nanocomposite itself may be made directly via the aforedescribed precipitation route.

Example 2

An alternative process for making a master batch is as follows (Yield approx. 26.25 g):

1. In a 2 liter beaker or glass reaction vessel, heat 500 ml mixed xylenes (e.g., mono or mixed isomers), with mild vortex stirring, to 115° C.

2. Dissolve 25 grams polypropylene (PP), such as Exxon-Mobil PP1024E4, into xylene, maintaining temperature and stirring. Keep boiling to a minimum. Depending on the size of PP particles (beads, powder, etc.), the time to complete dissolution varies from minutes to hours. Maintain approximate volume of solution by adding xylene as needed, or by refluxing.

3. Suspend and/or dissolve 0.39 g of benzalkonium chloride (BAC) in 25 ml xylene in a glass vial. Utilize either a horn sonicator or an ultrasonic bath for this purpose while maintaining constant room temperature.

4. Add 1.25 g of dried halloysite (e.g., Premium EG, NancoClay and Technologies, air milled and dried at 110° C.; or alternative inorganic mineral as disclosed above) to the 25 ml xylene/BAC mixture and pulse sonicate with a horn sonicator or ultrasonic bath.

5. Pour the contents of this vial into the hot stirring solution of PP and xylene. Rinse/shake vial with xylene and add to solution.

6. Allow the mixture to stir for 5-10 minutes to ensure homogeneity.

7. Prepare a vessel containing at least 500 ml of acetone or any other polypropylene non-solvent such as a low MW anhydrous alcohol (methanol). The liquid should be stirred at an angle (or with baffles) with a high-torque stirrer.

8. Add the PP solution into the vessel of liquid slowly by either dropping or a slow stream and allow to stir for 10 min.

9. Filter the precipitate over vacuum in a Büchner funnel. Rinse with fresh acetone three times. Allow to dry over vacuum for 30 minutes.

10. Break up filter cake and place in a vented, sparkless oven at 110° C. overnight.

11. Pulverize material in a blade grinder or other such device and add to an injection molder for nanocomposite piece formation.

It will be appreciated that several steps as set forth relative to the latter example, are similarly characterized by the general steps in the flowchart of FIG. 3, and hence the flowchart is intended to encompass the process as it is described above relative to both examples. Moreover, although described in detail with respect to polypropylene, as noted above, various soluble polymers may be considered for processing in accordance with the general steps set forth above and as depicted in FIG. 3.

As suggested by the final steps in the examples above, subsequent processing of the nanocomposite material may be achieved by forming the nanocomposite material using one of various forming processes. Examples of such forming processes include, but are not limited to, molding (e.g., compression, transfer, injection, blow, extrusion, expandable-bead, foam); compounding; extrusion (including extruded and oriented to form film or fibers); co-extrusion, rotomolding; thermoforming; vacuum forming; calendaring; matched-die molding; hand lay-up; filament winding; casting; and forging.

It will be appreciated that various of the above-disclosed embodiments, examples and other features and functions, or alternatives thereof, may be desirably combined into many other different systems or methods. Also, various presently unforeseen or unanticipated alternatives, modifications, variations or improvements therein may be subsequently made by those skilled in the art which are also intended to be encompassed by the following claims.

What is claimed is:

1. A method for production of a polymer nanocomposite master batch, comprising:
   dissolving a polymer in a solvent to produce a polymer solution;
   adding a dispersing aide to the polymer solution;
   further combining a nanomaterial filler to the polymer solution to produce a dissolved composite solution; and
   causing the precipitation of the dissolved composite solution to produce a nanocomposite master batch.

2. The method according to claim 1, wherein said filler material includes halloysite clay comprising tubules.

3. The method according to claim 1, wherein said filler material is selected from the group consisting of:
   clays;
   nanoclays;
   nanoclays comprising tubules;
   layered inorganic clay material;
   talc;
   carbon black;
   cellulose fibers;
   silica; and
   alumina.

4. The method according to claim 3, wherein said layered inorganic clay material includes smectite, kaolin, boulangerite, and imogolite.

5. The method according to claim 1, wherein said polymer is selected from the group consisting of: themoplastics, thermoplastic polymers, and blends thereof, co-polymers, thermosets, and elastomers.

6. The method according to claim 5, wherein said themoplastics are selected from the group consisting of: Polyolefins, including Polypropylene, Polyethylene, and the like; Polyaramide; Polyarylamide; Polycarbonate; Polystyrene; Polyvinyl chloride; Styrene Acrylonitrile; Acrylonitrile Butadiene Styrene; Acetal; Polysulfone; Polybutylene Terephthalate; Polyethylene Terephthalate; Polyethylene; Thermoplastic Polyurethane Elastomer; Polyphenylene Sulfide; Polyether Sulfone; Polyphenylene Oxide; Vinyl polymers; Acrylic polymers; Polyurethanes; Polyetherimide; Polyetheretherketone; Polyetherketone; Polymethylpentene; Perfluoroalkoxy; Ethylene Tetrafluroethylene; Polyvinylidene Fluoride; Fluorinated Ethylrene Propylene; Liquid Crystal Polymers; Polyphthalamide; Thermoplastic polyimide; and polyamide.

7. The method according to claim 1, wherein said dispersing agent is selected from the group consisting of: quaternary amines, silanes, titanates, organic acids, coupling agents and block co-polymers.

8. The method of claim 7 wherein said quaternary amines include quat compounds.

9. The method according to claim 1, further comprising the step of compounding the nanocomposite master batch with neat polymer to form a nanocomposite material.

10. A method of making a polymer nanocomposite, comprising:
    dissolving a polymer in a solvent to produce a polymer solution;
    adding a dispersing aide to the polymer solution;
    further combining at least one filler material to the polymer solution to produce a dissolved composite solution; and
    causing the precipitation of the dissolved composite solution to produce a nanocomposite material.

11. The method according to claim 10, wherein said filler material is selected from the group consisting of:
    clays;
    talc;
    carbon black;
    cellulose fibers;
    silica; and
    alumina.

12. The method according to claim 11, wherein said clays include a layered inorganic clay material selected from the group consisting of: smectite, kaolin, boulangerite, and imogolite.

13. The method according to claim 10, wherein said filler material includes halloysite.

14. The method according to claim 10, wherein said filler material includes halloysite clay comprising tubules.

15. The method according to claim 10, wherein said polymer is selected from the group consisting of: themoplastics; thermoplastic polymers, and blends thereof; co-polymers; thermosets; and elastomers.

16. The method according to claim 15, wherein said themoplastics are selected from the group consisting of: Polyolefins, including Polypropylene, Polyethylene, and the like; Polyaramide; Polyarylamide; Polycarbonate; Polystyrene; Polyvinyl chloride; Styrene Acrylonitrile; Acrylonitrile Butadiene Styrene; Acetal; Polysulfone; Polybutylene Terephthalate; Polyethylene Terephthalate; Polyethylene; Thermoplastic Polyurethane Elastomer; Polyphenylene Sulfide; Polyether Sulfone; Polyphenylene Oxide; Vinyl polymers; Acrylic polymers; Polyurethanes; Polyetherimide; Polyetheretherketone; Polyetherketone; Polymethylpentene; Perfluoroalkoxy; Ethylene Tetrafluroethylene; Polyvinylidene Fluoride; Fluorinated Ethylrene Propylene; Liquid Crystal Polymers; Polyphthalamide; Thermoplastic polyimide; and polyamide.

17. The method according to claim 10, wherein said dispersing agent is selected from the group consisting of: quaternary amines; silanes; titanates; organic acids; coupling agents; and block co-polymers.

18. The method according to claim 10, further comprising the step of forming the nanocomposite material.

19. The method according to claim 18, wherein forming the nanocomposite is accomplished using a forming process selected from the group consisting of: molding; compounding; extrusion; co-extrusion; rotomolding; thermoforming; vacuum forming; calendaring; matched-die molding; hand lay-up; filament winding; casting; and forging.

* * * * *